J. D. ENGLISH.
CHAIN COUPLING.
APPLICATION FILED AUG. 10, 1921.
1,434,052.　　　　　　　　　　　　Patented Oct. 31, 1922.
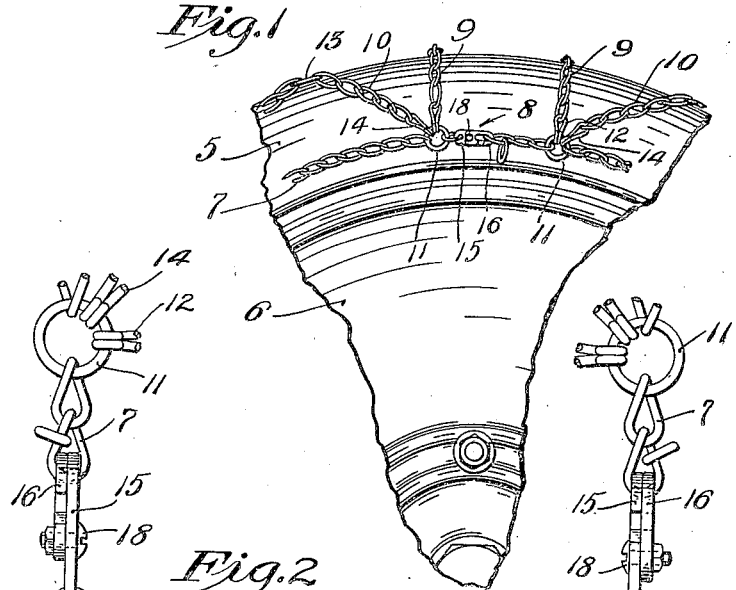
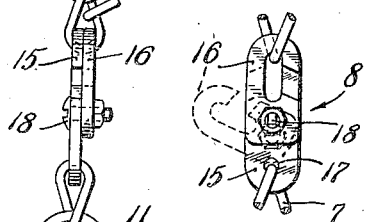
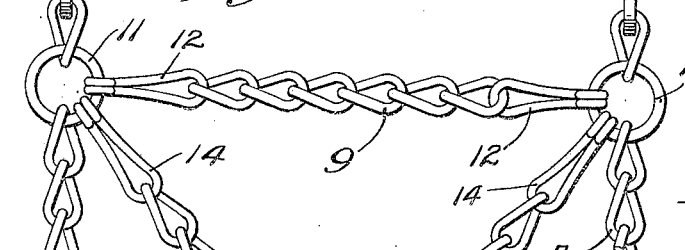
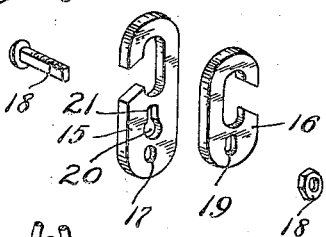
Inventor
John D. English
By his Attorneys
Merchant Kilgore & Kilgore Patented Oct. 31, 1922.

1,434,052

UNITED STATES PATENT OFFICE.

JOHN D. ENGLISH, OF WATERTOWN, SOUTH DAKOTA.

CHAIN COUPLING.

Application filed August 10, 1921. Serial No, 491,109.

*To all whom it may concern:*

Be it known that I, JOHN D. ENGLISH, a citizen of the United States, residing at Watertown, in the county of Codington and State of South Dakota, have invented certain new and useful Improvements in Chain Couplings; and I do hereby declare the following to be a full, clear, and exact description of the invention, such as will enable others skilled in the art to which it appertains to make and use the same.

My invention has for its object to provide an extremely simple and highly efficient chain coupling intended for general use but especially adapted for releasably connecting the side chains of non-skid chains, and, to this end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary side elevation of a pneumatic tire mounted on a disk wheel and having applied thereto the improved non-skid chain;

Fig. 2 is a fragmentary plan view of the invention;

Fig. 3 is a side elevation of one of the side chain couplings, with one of the members thereof moved into a releasing position and indicated by broken lines; and Fig. 4 is a perspective view of the coupling shown in Fig. 3, with the parts thereof separated.

The numeral 5 indicates a pneumatic tire mounted on a disk wheel 6 and having applied thereto the improved non-skid chain, which comprises side chains 7 with interposed couplings 8, cross tread chains 9 and oblique cross tread chains 10. The side chains 7 and cross tread chains 10 are like the well known Weed chain, with the exception that said side chains have interposed therein, in rectangular arrangement, coupling rings 11 to which the cross tread chains 10 are connected by the customary hook-like links 12. These links 12 are normally closed but may be sprung open to release worn-out or broken cross tread chains. Coupling rings 13 are centrally located one in each rectangle formed by the side chains 7 and cross tread chains 10 and to which coupling rings 13 are attached the inner ends of the oblique cross tread chains 10. The other or outer ends of the oblique cross tread chains 10 are releasably connected to the coupling rings 11 by hook-like links 14 similar to the links 12.

The two couplings 8 are identical the one with the other and each comprises two flat overlapping C-shaped members 15 and 16, the former of which has a rear end extension with an aperture 17 to receive one of the links of the respective side chain 7 to which it is permanently connected. A nut-equipped pivot bolt 18, having flattened sides, is mounted in a correspondingly formed aperture 19 in the coupling member 16 and thereby held against pivotal movement. This pivot bolt 18 extends through an aperture 20 in the coupling member 15 with freedom to permit pivotal movement of the coupling member 16 in respect to said coupling member 15, as indicated by broken lines in Fig. 3. Also formed in the coupling member 15 and leading from the aperture 20 is a lock notch 21 adapted to receive the pivot bolt 18 when the two coupling members 15 and 16 are turned into alignment and the coupling member 16 slid forward on the coupling member 15, as best shown in Fig. 3, and thereby lock said two coupling members together against pivotal movement. In case of slack in the side chains 7, the links thereof, releasably held by the couplings 8, cannot slide the coupling members 16 on the coupling members 15 to release the pivot bolts 18 from the lock notch 21, for the reason that said coupling members 15 will act as stops for said links of the side chains 7.

To open the couplings 8 and thereby release the side chains 7, the coupling members 16 must be slid by hand on the coupling members 15 to release the pivot bolts 18 from the lock notches 21 and then moved pivotally, as shown by broken lines in Fig. 3.

From the above description, it is evident that the couplings 8 cannot accidentally open up and release the side chains 7.

What I claim is:

1. A chain coupling comprising two overlapping reversely arranged hook-like members, and a pivot pin held by one of said members against pivotal movement and to which pivot pin the other coupling member is connected for combined pivotal and sliding movements and adapted to interlock with said pivot pin in one extreme position against pivotal movement, one of said coupling members being provided with an extension for attaching a chain directly thereto independent of said pivot pin.

2. A chain coupling comprising two overlapping reversely arranged hook-like members, and a pivot pin held by one of said members against pivotal movement and to which pivot pin the other coupling member is connected for combined pivotal and sliding movements and adapted to interlock with said pivot pin in one extreme position against pivotal movement, the coupling member to which the pivot pin is secured being provided with an extension for attaching a chain directly thereto independent of said pivot pin.

3. A chain coupling comprising two overlapping reversely arranged hook-like members, and a flat-faced pivot pin held by one of said members against pivotal movement, the other of said members having an aperture with a lock notch extension adapted to receive the pivot pin and thereby connect the coupling members for compound pivotal and sliding movements and lock said members against pivotal movement under pulling strain, the coupling member to which the pivot pin is secured being provided with an extension for directly attaching a chain thereto independent of the pivot pin.

In testimony whereof I affix my signature.

JOHN D. ENGLISH.